United States Patent Office.

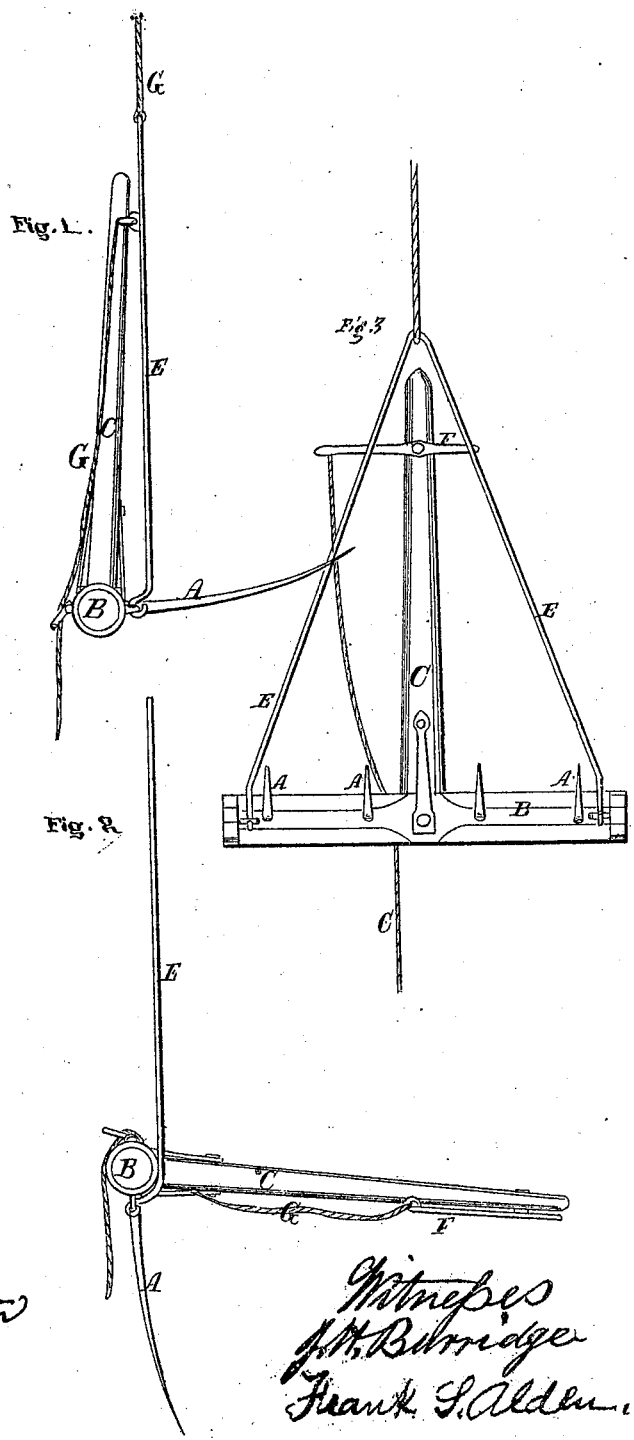

DAVID MORTON, OF MOUNT VERNON, OHIO.

Letters Patent No. 85,686, dated January 5, 1869.

IMPROVEMENT IN HORSE HAY-FORKS.

The Schedule referred to in these Letters Patent and making part of the same.

*To all whom it may concern:*

Be it known that I, DAVID MORTON, of Mount Vernon, in the county of Knox, State of Ohio, have invented a certain new and useful Improvement in Horse Hay-Forks; and I do hereby declare that the following is a full and complete description of the same, reference being had to the accompanying drawings, making a part of this specification, in which—

Figure 1 is a side view of the fork, loaded.

Figure 2, a side view, when unloaded.

Figure 3, a front view.

Like letters of reference refer to like parts in the several views presented.

The nature of this invention relates to a horse hay-fork, consisting of a series of tines secured in a head, said head being hung to a bail, whereby the fork is suspended and operated for the purpose of loading and discharging the hay from it.

In fig. 1, A represents the teeth of the fork, secured in a head or cross-piece, B.

Proceeding from said head is a standard or handle, C, whereby the fork is operated.

E is a bail, hinged to each end of the head, as shown in fig. 3, and whereby the fork is suspended over the hay when in operation.

F, fig. 3, is a lock, whereby the fork is secured in the position shown, and in which position it is when loaded for lifting.

The practical operation of this fork is as follows, viz:

As above said, the fork is suspended over the load by means of the bail attached to the rope G. On its being pulled down to the hay the tines are brought to the position shown in fig. 2, by depressing the handle C. In this position the tines are forced down into the hay as far as the head. The bail is then turned down upon the handle, as indicated by the dotted line a, and thereto secured by the rod F. The fork is now drawn upward by rope and pulleys attached to the bail, thereby elevating the hay, the fork assuming the position shown in figs. 1 and 3.

The hay is discharged from the fork by pulling the cord G, the result of which will be to allow the fork to fall to the position shown in fig. 2, so that the hay will slide from the fork to the place of deposit.

I am aware that a fork, constructed with tines A, fixed in a cross-head, and suspended by a bail, in the manner above described, has been used, but which I do not claim.

That which distinguishes my invention from others, is the device for locking and tripping the fork, which is much more simple, and more easily operated than that used in forks of this character. Hence,

What I claim as my invention, and desire to secure by Letters Patent, is—

The rod or lock F, pivoted to the handle C, and arranged in combination with the bail E, substantially as and for the purpose set forth.

DAVID MORTON.

Witnesses:
 J. H. BURRIDGE,
 FRANK S. ALDEN.